United States Patent
Wu et al.

(10) Patent No.: US 12,227,453 B2
(45) Date of Patent: Feb. 18, 2025

(54) CEMENT MORTAR CONTAINING EXCAVATED SOIL PREPARED BY REPLACING NATURAL SAND WITH ENGINEERING SOIL, AND PREPARATION METHOD THEREFOR AND APPLICATION THEREOF

(71) Applicant: SOUTH CHINA UNIVERSITY OF TECHNOLOGY, Guangdong (CN)

(72) Inventors: Bo Wu, Guangdong (CN); Huixuan Cao, Guangdong (CN)

(73) Assignee: SOUTH CHINA UNIVERSITY OF TECHNOLOGY, Guangzhou (CN)

(*) Notice: Subject to any disclaimer, the term of this patent is extended or adjusted under 35 U.S.C. 154(b) by 828 days.

(21) Appl. No.: 17/279,610

(22) PCT Filed: Oct. 31, 2019

(86) PCT No.: PCT/CN2019/114528
§ 371 (c)(1),
(2) Date: Mar. 25, 2021

(87) PCT Pub. No.: WO2020/173116
PCT Pub. Date: Sep. 3, 2020

(65) Prior Publication Data
US 2022/0033303 A1    Feb. 3, 2022

(30) Foreign Application Priority Data
Feb. 25, 2019   (CN) .................... 201910143702.8

(51) Int. Cl.
C04B 14/36   (2006.01)
C04B 14/06   (2006.01)
(Continued)

(52) U.S. Cl.
CPC ............ *C04B 14/361* (2013.01); *C04B 14/06* (2013.01); *C04B 28/02* (2013.01); *C04B 40/0046* (2013.01); *C04B 2103/302* (2013.01)

(58) Field of Classification Search
None
See application file for complete search history.

(56) References Cited

U.S. PATENT DOCUMENTS 5,370,185 A    12/1994   Cowan et al.

FOREIGN PATENT DOCUMENTS

CN    104261715    1/2015
CN    108409227    8/2018
(Continued)

OTHER PUBLICATIONS

Priyadharshini et al ("Sustainable Reuse of Excavation Soil in Cementious Composites", J Clean Prod 176 (2018) 999-1011). (Year: 2018).*

(Continued)

*Primary Examiner* — Michael Forrest
(74) *Attorney, Agent, or Firm* — JCIPRNET (57) ABSTRACT

The present invention discloses cement mortar containing excavated soil prepared by replacing natural sand with engineering soil, and a preparation method therefor and an application thereof. The preparation method includes drying and grinding waste engineering soil taken from a construction site first, sieving and mixing it to form recycled engineering soil, and putting the recycled engineering soil and natural sand into a mortar mixer according to a certain proportion to form a sandy soil mixture; then pouring water and cement into the mortar mixer, adding a part of the sandy soil mixture and a part of a water-reducing admixture, and evenly stirring; and finally, adding the remaining sandy soil (Continued)

mixture and water-reducing admixture, and evenly stirring to obtain the cement mortar containing excavated soil.

8 Claims, 3 Drawing Sheets

(51) Int. Cl.
*C04B 28/02* (2006.01)
*C04B 40/00* (2006.01)
*C04B 103/30* (2006.01)

(56) References Cited

FOREIGN PATENT DOCUMENTS

| CN | 108569854 | 9/2018 |
| CN | 109721310 | 5/2019 |

OTHER PUBLICATIONS

"International Search Report (Form PCT/ISA/210) of PCT/CN2019/114528", mailed on Jan. 22, 2020, with English translation thereof, pp. 1-4.

* cited by examiner

CEMENT MORTAR CONTAINING EXCAVATED SOIL PREPARED BY REPLACING NATURAL SAND WITH ENGINEERING SOIL, AND PREPARATION METHOD THEREFOR AND APPLICATION THEREOF

CROSS-REFERENCE TO RELATED APPLICATION

This application is a 371 of international application of PCT application serial no. PCT/CN2019/114528, filed on Oct. 31, 2019, which claims the priority benefit of China application no. 201910143702.8, filed on Feb. 25, 2019. The entirety of each of the above mentioned patent applications is hereby incorporated by reference herein and made a part of this specification.

BACKGROUND

Technical Field

The present invention relates to the field of building material technologies and construction waste resource utilization, and more particularly, to a cement mortar containing excavated soil prepared by replacing natural sand with engineering soil, and a preparation method therefor and an application thereof.

Description of Related Art

With a rapid development of a building industry and infrastructure construction in China, a large amount of engineering soil is produced in foundation engineering, underground engineering, and subway, road and bridge construction engineering. According to a survey, about 236 million tons of engineering soil was accumulated in China every year without proper processing during the decade from 2008 to 2018, which was increased at a rate of 10% year by year, wherein the most common engineering soil was weathered soil of granite. Main processing methods of construction soil in China include landfill, brick making and foundation paving. However, these simple and disorder processing methods have problems such as large energy consumption and low economic benefits, and may even cause engineering disasters, such as a particularly serious landslide accident caused by soil sliding in a receiving field in Guangming in Shenzhen on Dec. 20, 2015. As of 2018, a resource utilization rate of construction soil in China was only about 5%, which was far lower than 90% in Europe, America, Japan and South Korea. How to process the increasing soil has become an important issue in ecological environment protection and social sustainable development.

In order to improve a utilization rate and economic benefits of the engineering soil, and apply the engineering soil to the field of building materials, domestic and foreign scholars proposed that the engineering soil should be dried and ground to micron dimension, and replace some cementitious materials to be mixed into cement-based materials and concrete. However, since the ground engineering soil has a large specific surface area, is easy to absorb water and swell, and has a chemical composition quite different from that of the cement, there are some problems such as an obvious slump loss and a significant strength decrease. Although modifiers and stabilizers, such as foam, bentonite and polymer, are added to improve a working performance and mechanical properties of the engineering soil in later research, an effect is limited and a cost is high. Therefore, a new method is needed to solve problems such as a low utilization rate and a poor effect of an existing method.

SUMMARY

Technical Problems

In order to overcome the defects in the prior art, the present invention aims to provide a cement mortar containing excavated soil prepared by replacing natural sand with engineering soil, and a preparation method therefor and an application thereof.

The present invention provides a formula and a preparation method for a cement mortar containing excavated soil prepared by replacing natural sand with engineering soil, which can be used for solving problems such as a low replacement ratio, a complicated process, large energy consumption, poor mechanical properties and working performance, and the like in an existing engineering soil resource utilization method.

Problem Solutions

Technical Solutions

The objective of the present invention is achieved by at least one of the following technical solutions.

A method for cement mortar containing excavated soil prepared by replacing natural sand with engineering soil provided by the present invention includes the following steps:

(1) drying engineering soil to a constant weight in an electric heating blast drying oven at a temperature of 105±5° C.;

(2) sieving the dried engineering soil into A, B and C groups according to particle sizes, wherein a particle size of the sieved engineering soil of the A group is 0 mm to 0.25 mm, a particle size of the sieved engineering soil of the B group is 0.25 mm to 2.0 mm, and a particle size of the sieved engineering soil of the C group is greater than 2.0 mm;

(3) putting the engineering soil of the C group obtained in the step (2) into a grinder, after rotating and mixing evenly, and grinding with long and short overlapped blades for 2 times to 3 times, with each grinding lasting for 3 seconds to 8 seconds; and shaking continuously during grinding, and vibrating evenly after each grinding;

(4) pouring the engineering soil out of the grinder, and sieving the engineering soil of the C group with square hole sieves having square holes with side lengths of 0.25 mm and 4.75 mm respectively to obtain the sieved engineering soil;

(5) fully mixing the sieved engineering soil obtained in the step (4) with the engineering soil of the B group to form recycled engineering soil;

(6) mixing the recycled engineering soil obtained in the step (5) with sieved natural sand, adding into a mortar mixer, stirring to form a sandy soil mixture, and taking out and packing the mixture according to different replacement ratios for later use, wherein the replacement ratio is a percentage of a mass of the natural sand replaced with the recycled engineering soil to a total mass of originally needed natural sand; and (7) weighing water, cement, the sandy soil mixture and a water-reducing admixture; evenly dividing the sandy soil mixture and the water-reducing admixture into two parts respectively, adding the water and the cement into a clean mortar mixer, and stirring to form a cement slurry; then adding one part of the sandy soil mixture and one part of the water-reducing admixture, and stirring; and then adding the other part of the sandy soil mixture and the other part of the water-reducing admixture, and stirring to prepare the cement mortar containing excavated soil prepared by replacing the natural sand with the engineering soil. The cement mortar containing excavated soil is cement mortar containing excavated soil prepared by partially replacing natural sand with engineering soil.

Further, the engineering soil in the step (1) is weathered soil of granite, and the weathered soil of granite is the most common engineering soil produced in foundation engineering, underground engineering and subway construction.

Further, after sieving the dried engineering soil into the A, B and C groups according to the particle sizes in the step (2), the particle size of the sieved engineering soil of the A group is 0 mm to 0.25 mm, the particle size of the sieved engineering soil of the B group is 0.25 mm to 2.0 mm, and the particle size of the sieved engineering soil of the C group is greater than 2.0 mm.

Further, a motor speed of the grinder in the step (3) is 35000 r/min to 40000 r/min.

Further, a particle size of the sieved engineering soil in the step (4) is 0.25 mm to 4.75 mm. The particle sizes in the present invention are all particle diameters, which are used for describing particle scales.

Further, the sandy soil mixture in the step (6) includes the following raw materials in parts by mass:

30 parts to 70 parts of the recycled engineering soil; and
30 parts to 70 parts of the sieved natural sand.

The sieved natural sand meets requirements in GB/T 14684-2011 Sand for Construction, and a particle size of the sieved natural sand is 0.25 mm to 4.75 mm.

Further, a stirring speed of the stirring in the step (6) is 60±10 r/min, and the stirring lasts for 1 minute to 3 minutes.

Further, a stirring speed of the stirring in the step (7) is 60±10 r/min, and the stirring lasts for 1 minute to 2 minutes.

Further, the cement mortar containing excavated soil prepared by replacing the natural sand with the engineering soil in the step (7) includes the following raw materials in parts by mass:

212 parts to 275 parts of the water;
650 parts to 700 parts of the cement;
1600 parts to 1650 parts of the sandy soil mixture; and
10 parts to 80 parts of the water-reducing admixture.

Further, the cement in the step (7) is ordinary Portland cement; and the water-reducing admixture in the step (7) is an aqueous solution of a polycarboxylate water-reducing admixture, with a mass percentage concentration of 8% to 12%.

The cement mortar containing excavated soil prepared by replacing natural sand with engineering soil is prepared by the above preparation method.

An application of the cement mortar containing excavated soil prepared by replacing the natural sand with the engineering soil of the present invention to civil engineering is provided.

Beneficial Effects of Invention

Beneficial Effects

Compared with the prior art, the present invention has the following advantages and beneficial effects.

(1) According to the method provided by the present invention, a large amount of widely distributed engineering soil is used to replace a part of the natural sand, so that a demand for the natural sand in engineering construction can be reduced, thus reducing serious damage to a natural environment caused by a sand mining operation;

(2) compared with an existing method of partially replacing cementitious materials such as the cement with the engineering soil, the method provided by the present invention only needs to grind the engineering soil to a range of the particle size of the natural sand, without deeply grinding the engineering soil to a fineness of the cement, so that grinding energy consumption can be obviously reduced; and (3) compared with existing ordinary cement mortar, the cement mortar containing excavated soil prepared by replacing the natural sand with the engineering soil according to the preparation method provided by the present invention has excellent working performance and mechanical performance.

DESCRIPTION OF THE EMBODIMENTS

Implementation Manners of the Present Invention

The implementation of the present invention is further described hereinafter with reference to the drawings and the specific embodiments, but the implementation manners are not limited to this. It shall be noted that if there is any process or parameter that is not specifically described in detail hereinafter, it may be understood or realized by those skilled in the art with reference to the prior art.

Engineering soil used in the embodiments of the present invention was weathered soil of granite taken from a foundation pit of an A block in a "Village in City" reconstruction project of Xintang Company and Xinhe Company in Tianhe District of Guangzhou, and the weathered soil of granite was the most common engineering soil in engineering construction in Guangdong. A water-reducing admixture used in the embodiments and the comparative example was an aqueous solution of an RPC-H polycarboxylate water-reducing admixture produced by Guangdong Daoming Railway Equipment Co., Ltd., with a mass fraction concentration of 8% to 12%. Cement used in the embodiments and the comparative example was Yuexiu P•II 42.5R cement produced by Guangzhou Zhujiang Cement Co., Ltd. The sieved natural sand met requirements in GB/T 14684-2011 Sand for Construction.

A small amount of weathered soil of granite was taken for XRF chemical composition detection (performed in the Analysis and Testing Center of South China University of Technology in November 2018) to obtain chemical composition data of the weathered soil of granite sample. The chemical composition of the weathered soil of granite was compared with those of the cement and the natural sand, wherein chemical composition data of the cement came from General Portland Cement (GB 175-2007), and chemical composition data of the natural sand came from GB/T 14684-2011 Sand for Construction. Comparison results are shown in Table 1 below:

TABLE 1

| Detected sample | Chemical composition/% | | | | | |
| --- | --- | --- | --- | --- | --- | --- |
| | $SiO_2$ | $Fe_2O_3$ | $Al_2O_3$ | CaO | MgO | $K_2O$ |
| Weathered soil of granite | 50-70 | 0-10 | 10-20 | <1 | <1 | 0-10 |
| Natural sand | >95% | — | 13 | 13 | 13 | 13 |
| Cement | 20-23 | 3-6 | 4-8 | 64-67 | 13 | 13 |

Compared with the cement, the chemical composition of the weathered soil of granite is closer to the chemical composition of the natural sand, so that the weathered soil of granite is selected to replace the natural sand to prepare cement mortar containing excavated soil.

Embodiment 1

(1) Weathered soil of granite was preliminarily dried, and then dried in an electric heating blast drying oven at 100° C. to a constant weight.

(2) The dried weathered soil of granite was sieved into A, B and C groups according to particle sizes. A particle size of the sieved weathered soil of granite of the A group was 0 mm to 0.25 mm, a particle size of the sieved weathered soil of granite of the B group was 0.25 mm to 2.0 mm, and a particle size of the sieved weathered soil of granite of the C group was greater than 2.0 mm. The A group was discarded.

(3) The weathered soil of granite of the C group obtained in the step (2) was put into a high-speed grinder (at a motor speed of 35000 r/min to 40000 r/min), rotated and mixed evenly, ground with long and short overlapped blades for 3 times, with each grinding lasting for 6 seconds, shaken continuously during grinding, and vibrated evenly after each grinding.

(4) The weathered soil of granite in the grinder was poured out, and the ground weathered soil of granite of the C group was sieved with square hole sieves having square holes with side lengths of 0.25 mm and 4.75 mm respectively to obtain the sieved weathered soil of granite with a particle size of 0.25 mm to 4.75 mm.

(5) The sieved weathered soil of granite obtained in the step (4) was evenly mixed with the weathered soil of granite of the B group to form recycled weathered soil of granite.

(6) 5.67 kg of sieved natural sand (a particle diameter of the natural sand was 0.25 mm to 4.75 mm) and 2.43 kg of recycled weathered soil of granite (30 parts of the recycled weathered soil of granite and 70 parts of the sieved natural sand in parts by mass) were weighed, added into a mortar mixer, and stirred for 1 minute (at a stirring speed of mortar of 70 r/min) to form a sandy soil mixture.

(7) 1.30 kg of water, 102 g of water-reducing admixture (a mass fraction of a solute was 9%), 8.10 kg of sandy soil mixture in the step (6), and 3.29 kg of cement (257 parts of the water, 650 parts of the cement, 1600 parts of the sandy soil mixture, and 20 parts of the water-reducing admixture in parts by mass) were weighed, the sandy soil mixture and the water-reducing admixture were evenly divided into two parts respectively first, the water and the cement were added into a clean mortar mixer, and stirred for 1 minute (at a stirring speed of mortar of 70 r/min) to form a cement slurry. Then, one part of the sandy soil mixture and one part of the water-reducing admixture were added, and stirred in the mixer for 1 minute (at a stirring speed of mortar of 70 r/min), and then, the other part of the sandy soil mixture and the other part of the water-reducing admixture were added, and stirred for 1 minute (at a stirring speed of mortar of 70 r/min) to prepare the cement mortar containing excavated soil prepared by replacing the natural sand with the engineering soil (wherein the weathered soil of granite replaced 30% wt natural sand, i.e., a replacement ratio was 30%).

Embodiment 2

(1) Weathered soil of granite was preliminarily dried, and then dried in an electric heating blast drying oven at 105° C. to a constant weight.

(2) The dried weathered soil of granite was sieved into A, B and C groups according to particle sizes. A particle size of the sieved weathered soil of granite of the A group was 0 mm to 0.25 mm, a particle size of the sieved weathered soil of granite of the B group was 0.25 mm to 2.0 mm, and a particle size of the sieved weathered soil of granite of the C group was greater than 2.0 mm. The A group was discarded.

(3) The weathered soil of granite of the C group obtained in the step (2) was put into a high-speed grinder (at a motor speed of 35000 r/min to 40000 r/min), rotated and mixed evenly, ground with long and short overlapped blades for 2 times, with each grinding lasting for 8 seconds, shaken continuously during grinding, and vibrated evenly after each grinding.

(4) The weathered soil of granite in the grinder was poured out, and the ground weathered soil of granite of the C group was sieved with square hole sieves having square holes with side lengths of 0.25 mm and 4.75 mm respectively to obtain the sieved weathered soil of granite with a particle size of 0.25 mm to 4.75 mm.

(5) The sieved weathered soil of granite obtained in the step (4) was evenly mixed with the weathered soil of granite of the B group to form recycled weathered soil of granite.

(6) 4.05 kg of sieved natural sand (a particle diameter of the natural sand was 0.25 mm to 4.75 mm) and 4.05 kg of recycled weathered soil of granite (50 parts of the recycled weathered soil of granite and 50 parts of the sieved natural sand in parts by mass) were weighed, added into a mortar mixer, and stirred for 2 minutes (at a stirring speed of mortar of 60 r/min) to form a sandy soil mixture.

(7) 1.215 kg of water, 180 g of water-reducing admixture (a mass fraction of a solute was 10%), 8.10 kg of sandy soil mixture in the step (6), and 3.375 kg of cement (243 parts of the water, 675 parts of the cement, 1620 parts of the sandy soil mixture, and 36 parts of the water-reducing admixture in parts by mass) were weighed. The sandy soil mixture and the water-reducing admixture were evenly divided into two parts respectively first, the water and the cement were added into a clean mortar mixer, and stirred for 90 seconds (at a stirring speed of mortar of 60 r/min) to form a cement slurry. Then, one part of the sandy soil mixture and one part of the water-reducing admixture were added, and stirred in the mixer for 90 seconds (at a stirring speed of mortar of 60 r/min), and then, the other part of the sandy soil mixture and the other part of the water-reducing admixture were added, and stirred for 90 seconds (at a stirring speed of mortar of 60 r/min) to prepare the cement mortar containing excavated soil prepared by replacing the natural sand with the engineering soil (wherein the weathered soil of granite replaced 50% wt natural sand, i.e., a replacement ratio was 50%).

Embodiment 3

(1) Weathered soil of granite was preliminarily dried, and then dried in an electric heating blast drying oven at 110° C. to a constant weight.

(2) The dried weathered soil of granite was sieved into A, B and C groups according to particle sizes. A particle size of the sieved weathered soil of granite of the A group was 0 mm to 0.25 mm, a particle size of the sieved weathered soil of granite of the B group was 0.25 mm to 2.0 mm, and a particle size of the sieved weathered soil of granite of the C group was greater than 2.0 mm. The A group was discarded.

(3) The weathered soil of granite of the C group obtained in the step (2) was put into a high-speed grinder (at a motor speed of 35000 r/min to 40000 r/min), rotated and mixed evenly, ground with long and short overlapped blades for 3 times, with each grinding lasting for 3 seconds, shaken continuously during grinding, and vibrated evenly after each grinding.

(4) The weathered soil of granite in the grinder was poured out, and the ground weathered soil of granite of the C group was sieved with square hole sieves having square holes with side lengths of 0.25 mm and 4.75 mm respectively to obtain the sieved weathered soil of granite with a particle size of 0.25 mm to 4.75 mm.

(5) The sieved weathered soil of granite obtained in the step (4) was evenly mixed with the weathered soil of granite of the B group to form recycled weathered soil of granite.

(6) 2.43 kg of sieved natural sand (a particle diameter of the natural sand was 0.25 mm to 4.75 mm) and 5.67 kg of recycled weathered soil of granite particles (70 parts of the recycled weathered soil of granite and 30 parts of the sieved natural sand in parts by mass) were weighed, added into a mortar mixer, and stirred for 3 minutes (at a stirring speed of mortar of 50 r/min) to form a sandy soil mixture.

(7) 1.04 kg of water, 393 g of water-reducing admixture (a mass fraction of a solute was 11%), 8.10 kg of the sandy soil mixture in the step (6), and 3.436 kg of cement (212 parts of the water, 700 parts of the cement, 1650 parts of the sandy soil mixture, and 80 parts of the water-reducing admixture in parts by mass) were weighed. The sandy soil mixture and the water-reducing admixture were evenly divided into two parts respectively first, the water and the cement were added into a clean mortar mixer, and stirred for 2 minutes (at a stirring speed of mortar of 50 r/min) to form a cement slurry. Then, one part of the sandy soil mixture and one part of the water-reducing admixture were added, and stirred in the mixer for 2 minutes (at a stirring speed of mortar of 50 r/min), and then, the other part of the sandy soil mixture and the other part of the water-reducing admixture were added, and stirred for 2 minutes (at a stirring speed of mortar of 50 r/min) to prepare the cement mortar containing excavated soil prepared by replacing the natural sand with the engineering soil (wherein the weathered soil of granite replaced 70% wt natural sand, i.e., a replacement ratio was 70%).

Comparative Example 1

(1) 1.37 kg of water, 50 g of water-reducing admixture (a mass fraction of a solute was 10%), 8.1 kg of sieved natural sand (with a particle diameter of 0.25 mm to 4.75 mm), and 3.38 kg of cement (275 parts of the water, 676 parts of the cement, 1620 parts of the sieved natural sand, and 10 parts of the water-reducing admixture in parts by mass) were weighed, the sand and the water-reducing admixture were evenly divided into two parts respectively first, and then the water and the cement were added into a clean mortar mixer, and stirred for 2 minutes (at a stirring speed of mortar of 50 r/min) to form a cement slurry. Then, one part of the sieved natural sand and one part of the water-reducing admixture were added, and stirred in the mixer for 2 minutes (at a stirring speed of mortar of 50 r/min), and then, the other part of the sieved natural sand and the other part of the water-reducing admixture were added, and stirred for 2 minutes (at a stirring speed of mortar of 50 r/min) to prepare a cement mortar containing excavated soil (wherein the weathered soil of granite replaced 0% wt natural sand, i.e., a replacement ratio was 0%).

Test:

1. According to the stipulation in JGJ/T70-2009 Test Method for Basic Performance of Building Mortar, a consistency of the cement mortar containing excavated soil prepared in the Comparative Example and the Embodiments 1 to 3 was determined with a mortar consistency tester. Results are shown in Table 2.

TABLE 2

| Test specimen group number | Embodiment 1 | Embodiment 2 | Embodiment 3 | Comparative Example 1 |
|---|---|---|---|---|
| Consistency/mm | 60 | 71 | 75 | 53 |

2. According to the stipulation in GBT 17671-1999 Test Method for Strength of Cement Mortar (ISO Method), the cement mortar containing excavated soil prepared in the Comparative Example and the Embodiments 1 to 3 was poured into a trigeminy mold of 160 mm (length)×40 mm (width)×40 mm (height) for molding and mechanical compaction for 2 minutes, nine mortar test blocks were poured in each embodiment, numbered, and then placed in a constant-temperature and constant-humidity (at a temperature of 20±1° C. and a humidity of 95%) curing box for standard curing for 1 day, and then demolding. After the demolding, the mortar test blocks were moved into a standard curing room for curing to a test age.

Then, according to the stipulation in GBT 17671-1999 Test Method for Strength of Cement Mortar (ISO Method), 7d, 14d and 28d flexural strengths and compressive strengths of the mortar containing excavated soil in the Comparative Example and the Embodiments 1 to 3 were detected. Results are shown in Table 3, FIG. 2, and FIG. 3 below.

TABLE 3

| Test specimen | Flexural strength/MPa | | | Compressive strength/MPa | | |
|---|---|---|---|---|---|---|
| group number | 7 d | 14 d | 28 d | 7 d | 14 d | 28 d |
| Embodiment 1 | 9.05 | 10.15 | 12.08 | 43.85 | 49.42 | 61.87 |
| Embodiment 2 | 8.73 | 9.57 | 10.90 | 40.67 | 46.63 | 61.10 |
| Embodiment 3 | 7.96 | 9.11 | 10.46 | 34.50 | 41.80 | 55.01 |
| Comparative Example 1 | 8.83 | 9.54 | 11.35 | 46.74 | 54.11 | 64.48 |

It can be seen from data in Table 3 that the replacement ratio of the weathered soil of granite has a great influence on working performance of the mortar containing excavated soil, and a demand of a polycarboxylate water-reducing admixture may be determined according to the consistency. With increase of the replacement ratio, the flexural strength of the mortar containing excavated soil is increased first and then decreased, while the compressive strength of the mortar containing excavated soil is decreased slowly. When a mass ratio of the weathered soil of granite to the natural sand is 50:50 (i.e., the replacement ratio is 50%), the flexural strength and the compressive strength are almost the same as those of ordinary cement mortar.

Figure 1:
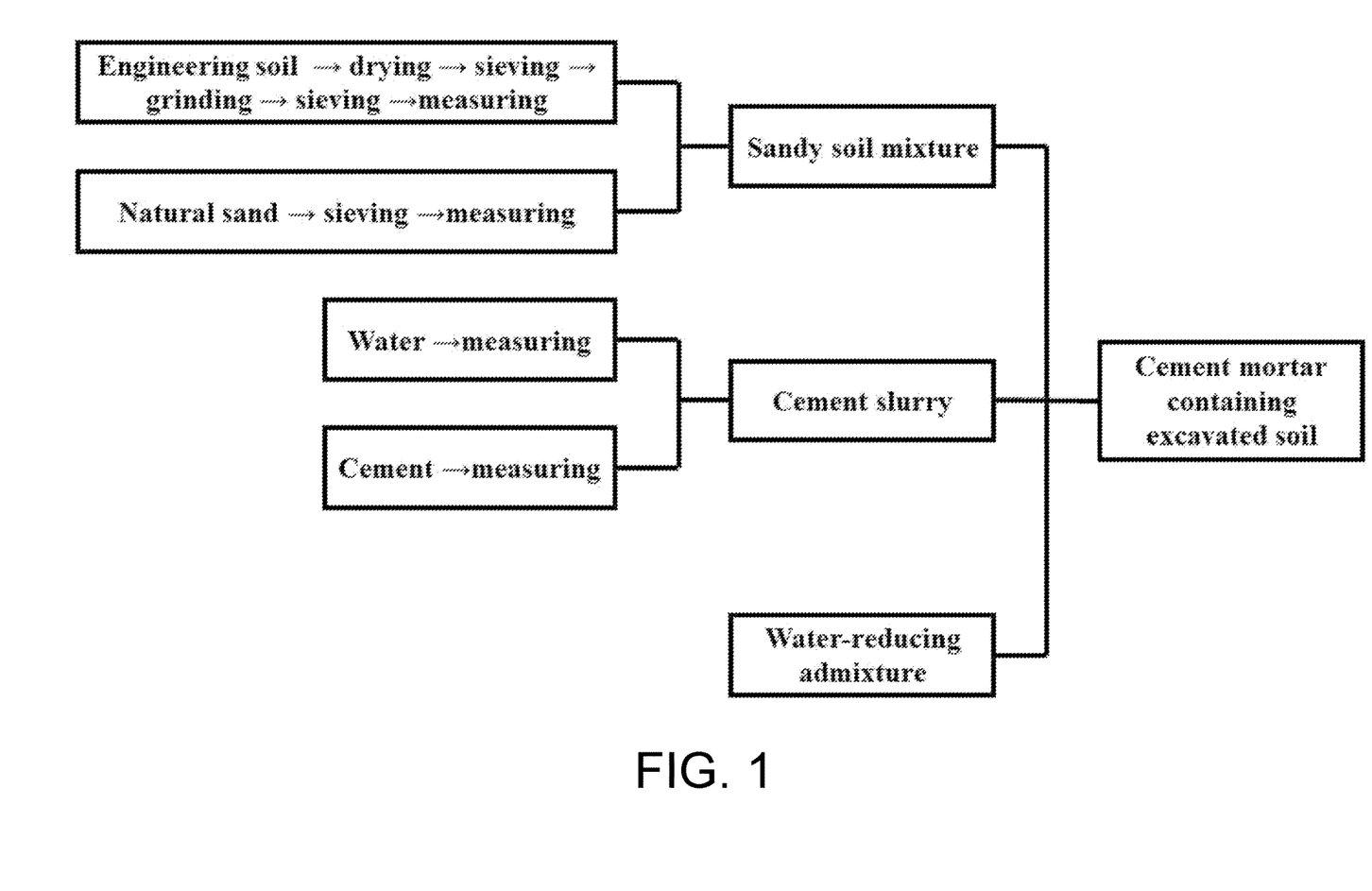
FIG. 1 is a process flow diagram of cement mortar containing excavated soil prepared by replacing natural sand with engineering soil provided by the present invention.
Figure 2:
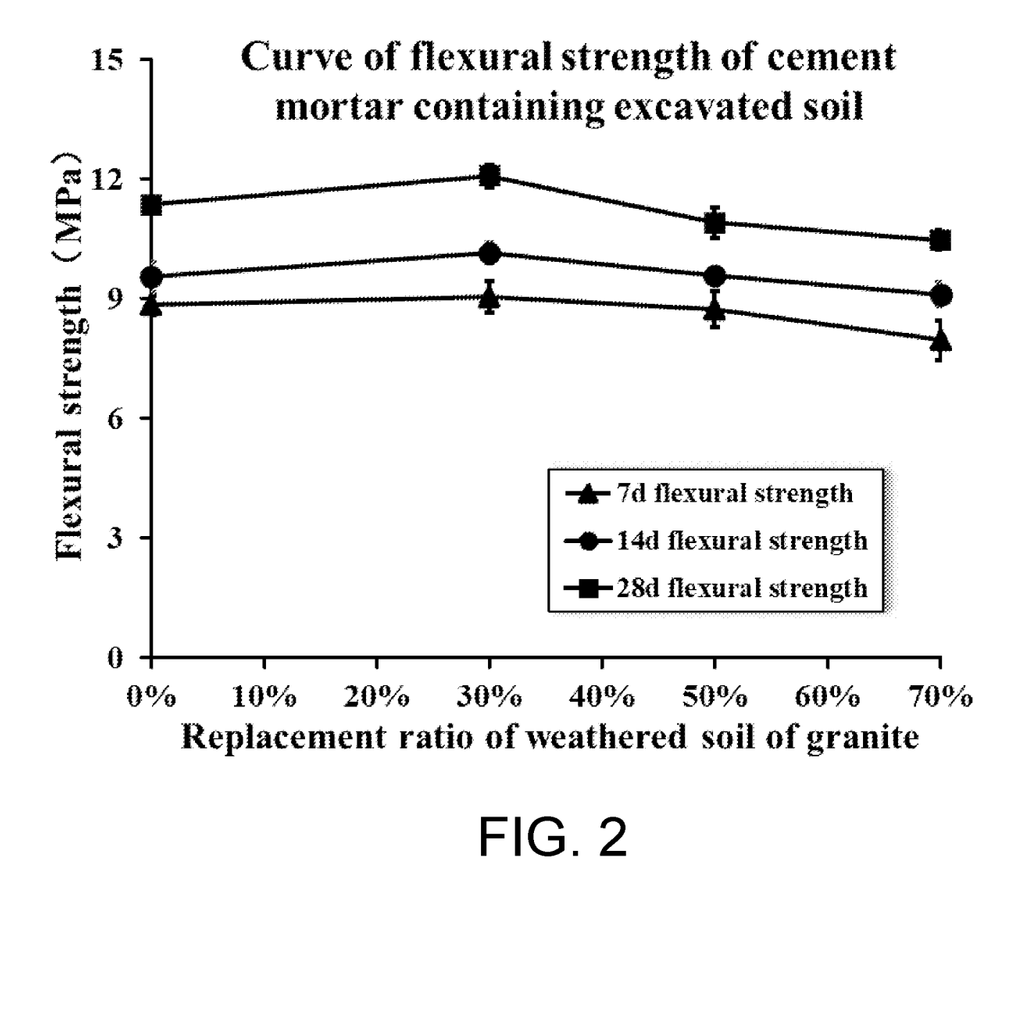
FIG. 2 is a curve graph showing changes of 7 d, 14 d and 28 d flexural strengths of the cement mortar containing excavated soil prepared in Embodiments 1 to 3 and the Comparative Example 1 with respect to replacement ratios of the engineering soil.

As shown in FIG. 2, FIG. 2 is a curve graph showing changes of the 7d, 14d and 28d flexural strengths of the cement mortar prepared in the Embodiments 1 to 3 and the Comparative Example with respect to the replacement ratios of the engineering soil (weathered soil of granite). The replacement ratios of the weathered soil of granite on an X-coordinate of FIG. 2 represent mass percentages of the engineering soil (weathered soil of granite) replacing the natural sand. As shown in FIG. 2, the 7 d, 14 d and 28 d flexural strengths of the cement mortar containing excavated soil prepared in the Embodiment 1 (with the replacement ratio of 30%) are 3%, 6% and 7% higher than those of the cement mortar prepared in the Comparative Example 1. The 7d, 14d and 28d flexural strengths of the cement mortar containing excavated soil prepared in the Embodiment 2 (with the replacement ratio of 50%) and the cement mortar containing excavated soil prepared in the Embodiment 3 (with the replacement ratio of 70%) are almost the same as those of the cement mortar prepared in the Comparative Example 1.

Figure 3:
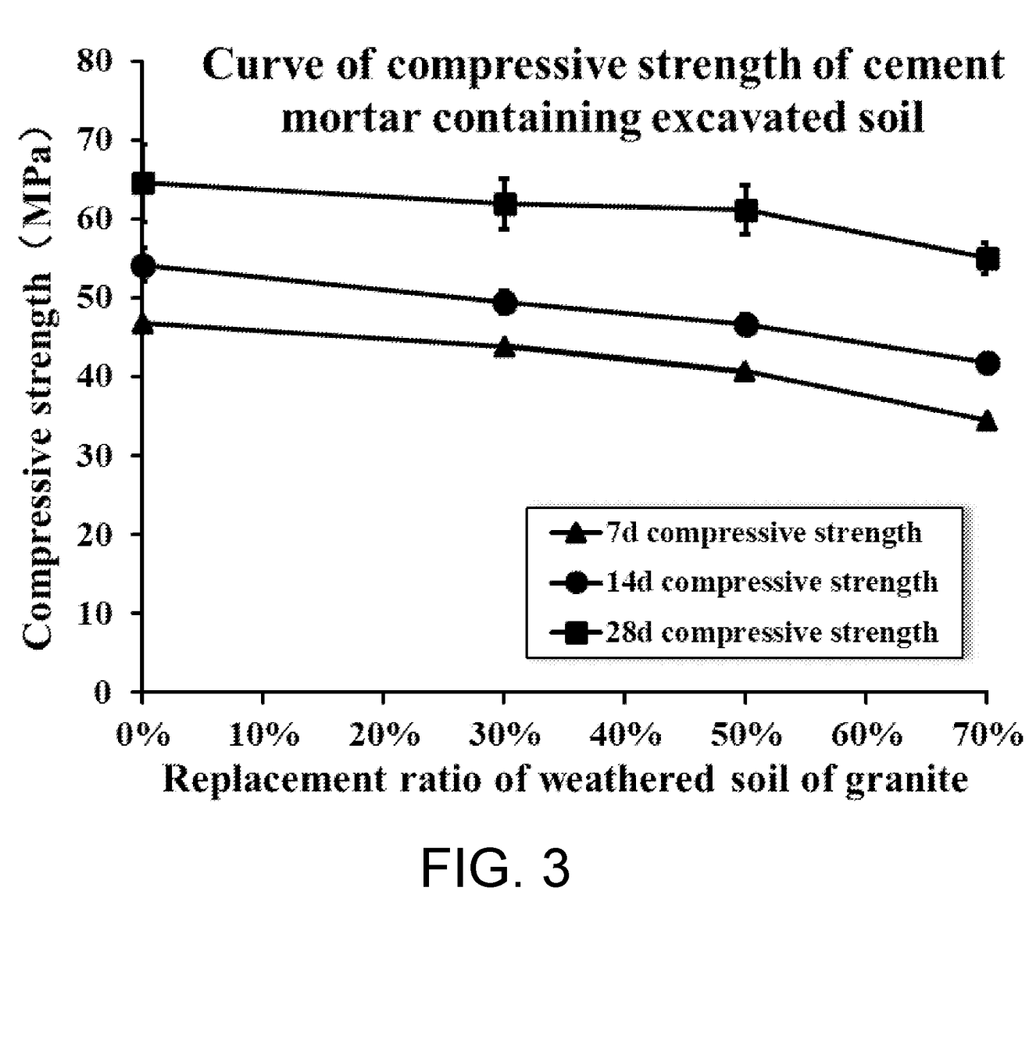
FIG. 3 is a curve graph showing changes of 7 d, 14 d and 28 d compressive strengths of the cement mortar containing excavated soil prepared in Embodiments 1 to 3 and the Comparative Example 1 with respect to the replacement ratios of the engineering soil.

As shown in FIG. 3, FIG. 3 is a curve graph showing changes of the 7d, 14d and 28d compressive strengths of the cement mortar prepared in the Embodiments 1 to 3 and the Comparative Example with respect to the replacement ratios of the weathered soil of granite. The replacement ratios of the weathered soil of granite on an X-coordinate of FIG. 3 represent mass percentages of the weathered soil of granite replacing the natural sand. As shown in FIG. 3, the 7d, 14d and 28d compressive strengths of the cement mortar containing excavated soil prepared in the Embodiment 1 (with the replacement ratio of 30%) are almost the same as those of the cement mortar prepared in the Comparative Example 1. The 7d, 14d and 28d compressive strengths of the cement mortar containing excavated soil prepared in Embodiment 2 (with the replacement ratio of 50%) and the Embodiment 3 (with the replacement ratio of 70%) on 7 d, 14 d and 28 d are slightly lower than those of the cement mortar prepared in the Comparative Example 1.

It can be seen from results of the embodiments and the comparative example that, according to the method for the cement mortar containing excavated soil prepared by replacing the natural sand with the engineering soil provided by the present invention, the engineering soil may replace the natural sand to serve as the raw material of the cement mortar containing excavated soil, and the replacement ratio may reach 70%. On one hand, a huge amount of engineering soil causing certain pollution to the environment is fully utilized, thus implementing resource utilization of construction waste; and on the other hand, precious river sand resources are economized, an ecological environment is protected, a production cost and disposal cost of the weathered soil of granite are reduced on the premise of guaranteeing excellent working performance and mechanical properties of the mortar containing excavated soil, thus having good economic and social benefits.

The above embodiments are only the preferred implementation manners of the present invention, which are only used to explain the present invention, and are not intended to limit the present invention. The changes, substitutions, modifications, and the like made by those skilled in the art without departing from the spirit of the present invention shall belong to the scope of protection of the present invention.

What is claimed is:

1. A preparation method for a cement mortar containing an excavated soil prepared by replacing a natural sand with an engineering soil, wherein the preparation method comprises the following steps:
   (1) drying the engineering soil to a constant weight at a temperature of 105±5° C.;
   (2) sieving the dried engineering soil into A, B and C groups according to particle sizes;
   (3) putting the engineering soil of the C group obtained in the step (2) into a grinder to grind for 2 times to 3 times, with each grinding lasting for 3 seconds to 8 seconds;
   (4) sieving the ground engineering soil of the C group to obtain a sieved engineering soil;
   (5) mixing the sieved engineering soil obtained in the step (4) with the engineering soil of the B group to form a recycled engineering soil;
   (6) mixing the recycled engineering soil obtained in the step (5) with a sieved natural sand, adding into a mortar mixer, stirring to form a sandy soil mixture, and taking out the sandy soil mixture for later use; and
   (7) weighing water, cement, the sandy soil mixture and a water-reducing admixture;
   evenly dividing the sandy soil mixture and the water-reducing admixture into two parts, adding the water and the cement into the mortar mixer, and stirring to form a cement slurry; then adding one part of the sandy soil mixture and one part of the water-reducing admixture, and stirring; and then adding the other part of the sandy soil mixture and the other part of the water-reducing admixture, and stirring to prepare the cement mortar containing the excavated soil prepared by replacing the natural sand with the engineering soil.

2. The preparation method according to claim 1, wherein the engineering soil in the step (1) is a weathered soil of granite produced in a foundation engineering, an underground engineering and a subway construction.

3. The preparation method according to claim 1, wherein after sieving the dried engineering soil into the A, B and C groups according to the particle sizes in the step (2), a particle size of the sieved engineering soil of the A group is 0 mm to 0.25 mm, a particle size of the sieved engineering soil of the B group is 0.25 mm to 2.0 mm, and a particle size of the sieved engineering soil of the C group is greater than 2.0 mm.

4. The preparation method according to claim 1, wherein a motor speed of the grinder in the step (3) is 35000 r/min to 40000 r/min; and a particle size of the sieved engineering soil in the step (4) is 0.25 mm to 4.75 mm.

5. The preparation method according to claim 1, wherein the sandy soil mixture in the step (6) comprises the following raw materials in parts by mass:

30 parts to 70 parts of the recycled engineering soil; and 30 parts to 70 parts of the sieved natural sand;

a particle size of the sieved natural sand is 0.25 mm to 4.75 mm.

6. The preparation method according to claim 1, wherein a stirring speed of the stirring in the step (6) is 60±10 r/min, and the stirring in the step (6) lasts for 1 minute to 3 minutes; and a stirring speed of the stirring in the step (7) is 60±10 r/min, and the stirring in the step (7) lasts for 1 minute to 2 minutes.

7. The preparation method according to claim 1, wherein the cement mortar containing the excavated soil prepared by replacing the natural sand with the engineering soil in the step (7) comprises the following raw materials in parts by mass:

212 parts to 275 parts of the water;

650 parts to 700 parts of the cement;

1600 parts to 1650 parts of the sandy soil mixture; and 10 parts to 80 parts of the water-reducing admixture.

8. The preparation method according to claim 1, wherein the cement in the step (7) is an ordinary Portland cement; and the water-reducing admixture in the step (7) is an aqueous solution of a polycarboxylate water-reducing admixture, with a mass percentage concentration of 8% to 12%.

* * * * *